Feb. 5, 1952 J. T. WELSH 2,584,648
UNIVERSAL JOINT HAVING ONE CENTER OF DEFLECTION
Filed Nov. 16, 1946 3 Sheets-Sheet 1

INVENTOR.
JOHN T. WELSH
BY
Kenyon & Kenyon
ATTORNEYS

INVENTOR.
JOHN T. WELSH
BY
Kenyon & Kenyon
ATTORNEYS

Feb. 5, 1952      J. T. WELSH      2,584,648
UNIVERSAL JOINT HAVING ONE CENTER OF DEFLECTION
Filed Nov. 16, 1946      3 Sheets-Sheet 3

INVENTOR.
JOHN T. WELSH
BY
Kenyon & Kenyon
ATTORNEYS

Patented Feb. 5, 1952

2,584,648

UNITED STATES PATENT OFFICE 2,584,648

UNIVERSAL JOINT HAVING ONE CENTER OF DEFLECTION

John T. Welsh, Highland Park, N. J.; Alrena L. Welsh executrix of said John T. Welsh, deceased Application November 16, 1946, Serial No. 710,257

3 Claims. (Cl. 64—21)

1

This invention relates to universal joints and more particularly to universal joints having one center of deflection, such that the speed of the driven shaft is at all times the same as that of the driving shaft.

In the ordinary type of rigid universal joint or Hooke's coupling, where the driven shaft is arranged at an angle with respect to the driving shaft, the speed of the driven shaft varies from a maximum to a minimum or vice versa during each one-quarter revolution. For instance, where the driven shaft is arranged at an angle of 10° with respect to the driving shaft and the latter shaft is driven at a speed of 500 R. P. M., the maximum velocity of the driven shaft will be 508 R. P. M. and the minimum 492 R. P. M., making a variation of 16 R. P. M. during each one-quarter revolution. As the angle between the driving shaft and the driven shaft increases, the variation in speed is correspondingly increased. In the case of automobile transmissions, this results not only in increased friction upon the bearings of the universal joint but also in the imposition of severe strains upon the gears with which the driven shaft is connected and upon the fly-wheel of the driving shaft.

In the ordinary type of rigid universal joint, or Hooke's coupling, where the driven shaft is arranged at an angle with respect to the driving shaft, the speed of the driven shaft varies from a maximum to a minimum, or vice versa, during each one-quarter revolution. The reason for this is that the trunnions, on which the shaft of each fork pivots, travel in a plane at right angles to the axis of its respective shaft. These planes bisect each other along a line at right angles to the axes of the two shafts. When the trunnions in either fork are on the aforesaid bisecting line, the shafts are in phase. This occurs four times in each revolution. Between these four points in each revolution, there occurs a variation in the angular velocity of the two shafts. Thus, when the drive shaft is rotating at constant angular velocity with ten degrees angularity between the axes of the two shafts, the driven shaft will lag one degree and twenty-two minutes behind the drive shaft, after the drive shaft has rotated forty-five degrees beyond the point where the shafts were in phase; and will be in phase again after rotating through another forty-five degrees. In rotating through the next ninety degrees, the driven shaft will gain one degree and twenty-two minutes in the first forty-five degree rotation, and will be in phase again after rotating an additional forty-five degrees. This accounts for the speed variations noted above. If the angularity between the shafts is twenty degrees, a corresponding lag and lead in each ninety degrees of revolution will be five de-

2 grees and forty-eight minutes, and at forty degrees' angularity, twenty-one degrees and forty minutes.

In the new joint disclosed hereinafter, the bevel pinion and rollers travel in a plane which bisects the angle between the axes of the drive and driven shafts so that the shafts are always in phase and the angular velocity between the two is constant, regardless of the angularity between the two shafts. While ten degree angularity was used to illustrate the difference in the functioning of the two universal joints, the new joint will transmit power at appreciable speeds with uniform motion when there are other angularities within the usual range, between the axes of the two shafts.

Accordingly, one object of this invention is to provide a universal joint having one center of deflection such that the driven and driving shafts constantly rotate at the same speed.

Another object of this invention is to provide such a universal joint in which one center of deflection is obtained by a simple yet positive acting means.

Another object of this invention is to provide such a universal joint which is simple, compact, of relatively light weight, and easily assembled and disassembled.

Other and further objects of this invention will appear during the course of the following description when taken with the accompanying drawings in which.

Figure 1:
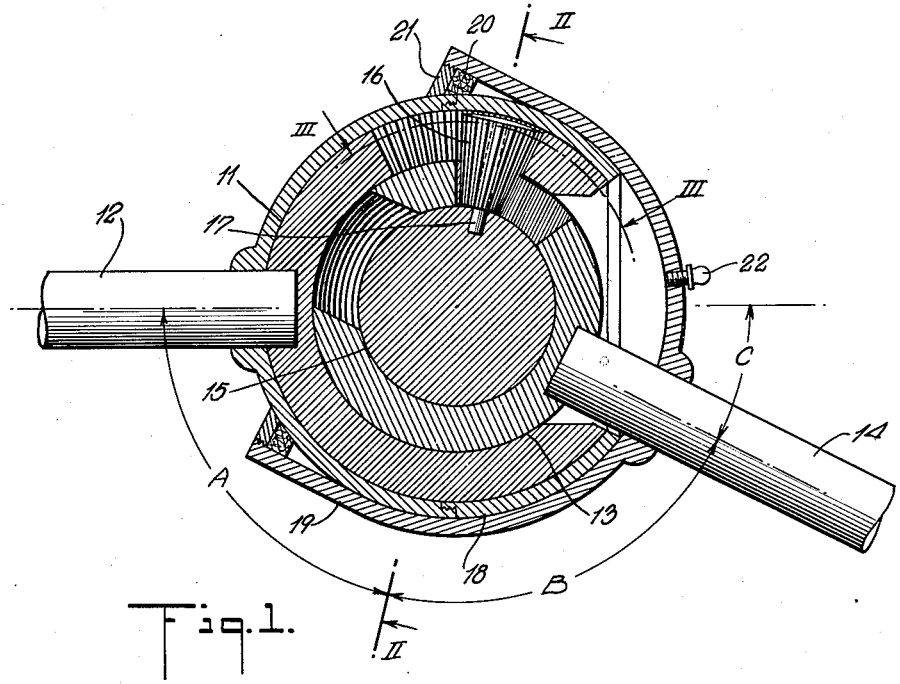
Fig. 1 is a cross-sectional view of one embodiment of this invention.

In Fig. 1 is shown an outer substantially spherically shaped member 11 centered on the end of driving shaft 12. Disposed within this member 11 is a similar substantially spherically shaped inner member 13 centered on the end of driven shaft 14. Member 11 is suitably cut away as shown in order to allow shaft 14 to extend therethrough and shafts 12 and 14 are rigidly secured to members 11 and 13 respectively by any suitable means such as keying, splining or welding. The axis of shaft 14 is shown at an acute angle C with the axis of shaft 12, this being the maximum deviation angle possible for the embodiment illustrated but this, of course, can be varied at will within reasonable limits by proper design of the joint. Disposed within member 13 is a substantially spherical ball 15, and a beveled toothed roller or gear 16 is rotatably secured as by means of pin 17 at a point on the periphery of ball 15, gear 16 extending through cooperating longitudinal slots cut in members 11 and 13 and forming races as shown. By the term longitudinal as used here and hereinafter in this specification is meant substantially in a plane including the driving and driven shafts or a plane parallel to that plane. The detailed construction of these slots is shown more clearly in Figs. 2 and 3. The beveled surfaces of gear 16 are preferably cut to coincide with arcuate planes described by radii extended from the center of the universal joint, and the axis of rotation of gear 16 coincides with a radius extended from the center of the joint as shown. Surrounding the joint thus far described are means for sealing the joint for ease of lubrication, comprising a substantially spherical shell 18 shown in two halves connected by means of a screw joint, shell 18 being rigidly held with respect to member 11 and shaft 12 and cut away as shown to allow relative movement of member 13 and shaft 14. Surrounding shell 18 is a second sealing shell 19 rigidly held with respect to shaft 14 and sealed at its end opposite shaft 14 by means of packing member 20 and threaded sealing ring 21 as shown. A lubrication connection 22 is provided extending through shell 19.

Figure 2:
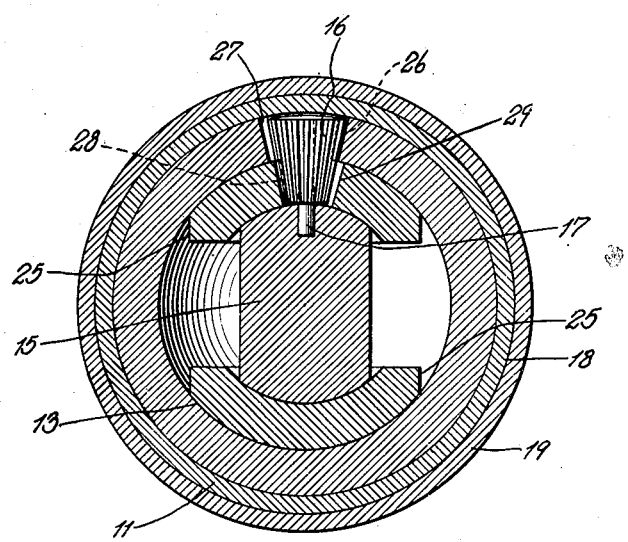
Fig. 2 is a cross-sectional view through plane II—II of Fig. 1 with the driving and driven shafts in axial alignment.

In Fig. 2 it has been assumed that shaft 14 of Fig. 1 has been moved relative to shaft 12 so that both shafts are in axial alignment in order to show the manner in which members 11 and 13 and ball 15 are cut away for ease of assembly of the joint and the manner in which gear 16 insures a positive acting single center of deflection between members 11 and 13. The sides of ball 15 are machined away to form parallel faces as shown and member 13 is machined away sufficiently to allow the placement of ball 15 within member 13 in a position 90° away from that shown, ball 15 then being rotated 90° into the proper position. Member 13 is also machined to provide two parallel faces 25 in a plane perpendicular to those machined for the entry of ball 15, and outer member 11 is suitably cut away as shown in Fig. 1 to allow the entry of member 13 when it is turned 90° away from the position illustrated, being rotated thereafter into the proper position during assembly. The slot provided in outer member 11 for the entry of gear 16 has a toothed race 26 provided on one side which engages the teeth of gear 16 and the other side of the slot is cut away as at 27 so that it does not bear against gear 16. Similarly the opposite wall of the corresponding slot of inner member 13 is formed into a toothed race 28 to engage the teeth of gear 16 and the opposing wall is cut away as at 29 so that it does not touch gear 16. When ball 15 and members 11 and 13 have been assembed together and rotated into their proper positions, gear 16 can then be dropped through the corresponding slots of members 11 and 13 into the position shown, then being rotatably secured to ball 15 by means of pin 17 which extends through gear 16 into ball 15. Sealing shells 18 and 19 can thereafter be slipped over the unit as shown to complete the assembly. Thus, since gear 16 provides the common center of deflection between members 11 and 13, there has been disclosed in Figs. 1 and 2 a positive action means which insures that as the axes of shafts 12 and 14 are displaced one from the other, gear 16 will move to a position such that plane II—II (Fig. 1) through its axis bisects the obtuse angle between shafts 12 and 14, forming the two equal angles A and B (Fig. 1). It is, of course, obvious that ball 15 and pin 17 are not essential to the operation of this embodiment of this invention and can be dispensed with in a particular joint if desired. Similarly, sealing shells 18 and 19 are not necessary and may be dispensed with in case a sealed lubricated joint is not required.

Figure 3:
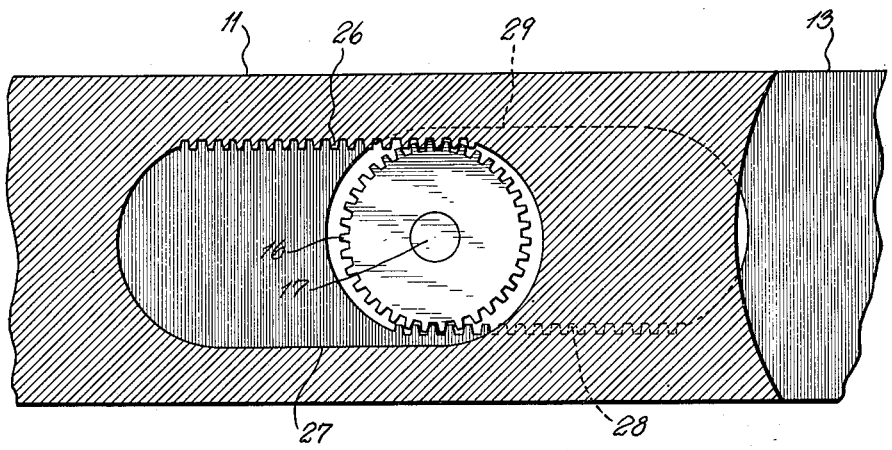
Fig. 3 is a developed view along line III—III of Fig. 1.

In Fig. 3 is shown in a flattened-out developed view in more detail the manner in which gear 16 meshes with the corresponding races 26 and 28 provided on the opposite face of the slots of members 11 and 13 respectively.

Figure 4:
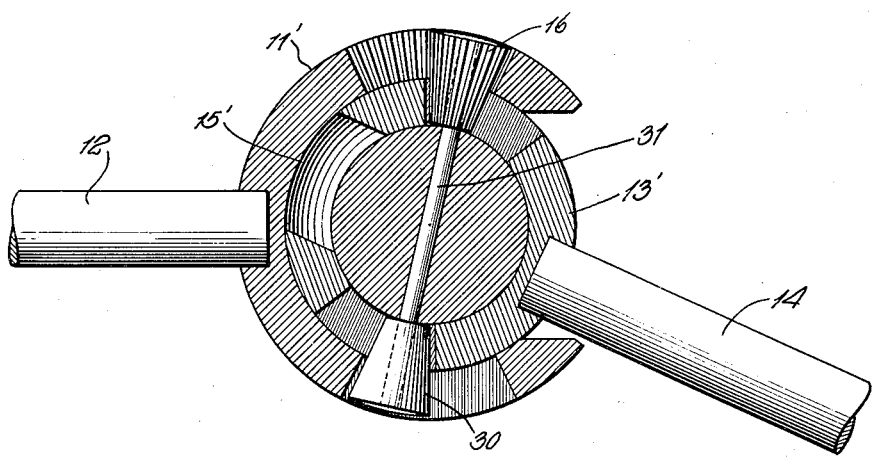
Fig. 4 is a cross-sectional view showing the essential portions of an alternative embodiment of this invention.

In Fig. 4 is shown a cross-sectional view of another alternative embodiment of this invention. Lubricating sealing members similar to those shown in Fig. 1 have been omitted for the sake of clarity of the drawing. Similar components of the units of Figs. 1 and 4 have been similarly numbered. Member 11' is similar to member 11 of Fig. 1 and member 13' is similar to member 13, the difference being that members 11' and 13' have an additional slot therethrough directly opposite the slot provided for the entrance of gear 16 in order to allow the placement of a beveled roller 30 in the unit. As shown a long transmission member or pin 31 extends through center ball 15' and through an axial aperture of gear 16. The other end of member 31 extends through an axial aperture of roller 30 so that any circumferential motion of gear 16 in a plane including shafts 12 and 14 will be transferred immediately to roller 30. Roller 30 is snugly fitted against the sides of the slots shown in members 11' and 13' so that as it rolls over them in the operation of the universal joint, a good bearing contact surface with each is maintained at all times to transmit rotary motion of the joint therebetween. Thus, it is apparent that the universal joint of Fig. 4 is adapted to transmit larger torques and powers than that of Fig. 1.

Figure 5:
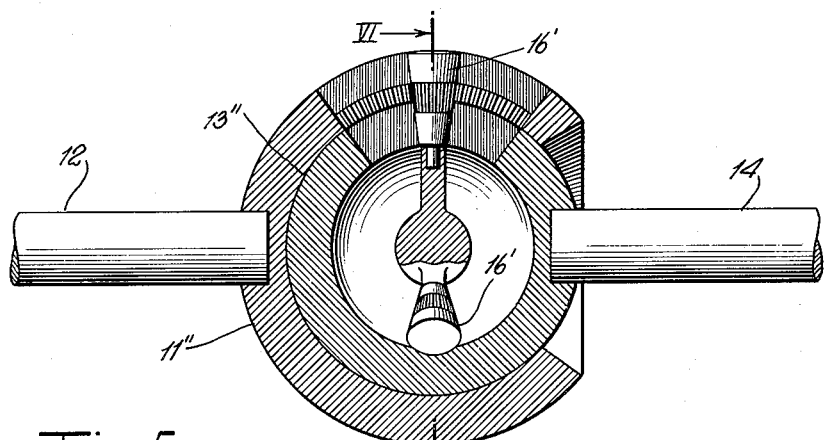
Fig. 5 is a schematic cross-sectional view showing the essential elements of another alternative embodiment of this invention.

In Fig. 5 is shown in cross-sectional view still another embodiment of a universal joint according to this invention. Again, the lubricating sealing members of Fig. 1 have been omitted for the sake of clarity of the drawing. This universal joint is intended to transmit even larger amounts of power than that for which the joint of Fig. 4 is designed, and as shown it differs from that of Fig. 1 in that three beveled toothed rollers 16' are utilized to transmit power between members 11'' and 13''. The spatial relation of these three toothed rollers 16' is shown more clearly in Fig. 6. A longitudinal slot in member 11'' and a cooperating longitudinal slot in member 13'' provide races for each roller 16' as shown, and each beveled roller 16' has approximately its center third portion cut to form a toothed gear portion thereat. A corresponding portion of the longitudinal wall of the slot of member 11' shown has formed on it a toothed rack or race to mesh with the gear portion of the corresponding roller 16' shown.

Figure 6:
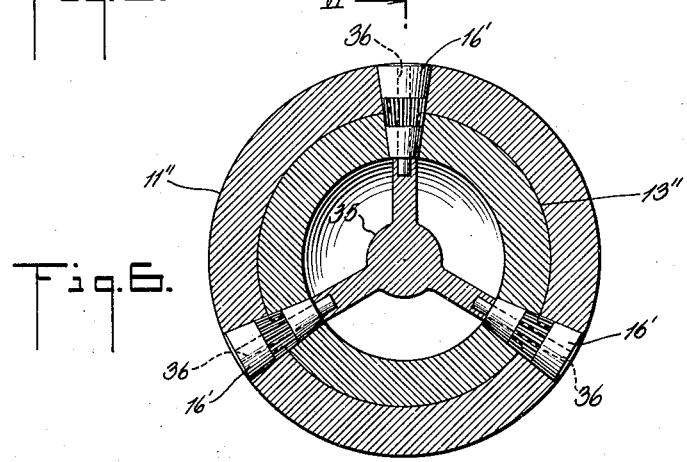
Fig. 6 is a schematic cross sectional view through plane VI—VI of Fig. 5.

In Fig. 6 is shown a cross-sectional view through plane VI—VI of Fig. 5 which shows with greater clarity the arrangement of the toothed racks on the slots of members 11'' and 13''. One longitudinal wall of the slot of member 11" has formed on it a toothed rack as above-described, and the opposite wall of the corresponding slot of member 13" is similarly provided with a toothed rack or race to mesh with the toothed roller 16' as shown, and all other longitudinal portions of the slots in members 11" and 13" fit snugly against roller 16' to provide a good bearing surface upon which the roller 16' may roll during operation of the universal joint. Thus, the smooth portions of rollers 16' bearing against the cooperating smooth surfaces of the races of members 11" and 13" take the major portion of the thrust between these members as the joint rotates while the toothed portion meshing with the cooperating teeth of the races fixes the relative position of the members to maintain one center of deflection as the joint is flexed during rotation. The three rollers 16' are spaced equidistant one from the other around the periphery of the universal joint and are connected by a transmission member 35 of the shape shown. A pin 36 extends through an axial aperture of each roller 16' into a corresponding aperture in member 35 so that each roller 16' is rotatable upon its pin 36. Thus, the power is transmitted between the halves of the universal joint by means of three rollers instead of one and each roller is of a heavy duty type since it provides a bearing area over a large portion of its surface as above-described. It is, of course, obvious that transmission member 35 and pins 36 are not essential to this embodiment since each roller 16' is in itself a positive acting device because its center toothed portion meshes with the opposing toothed racks of the cooperating slots of members 11" and 13".

Figure 7:
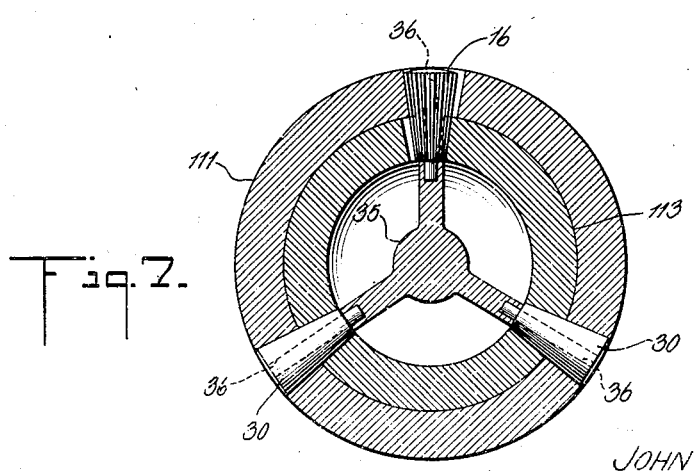
Fig. 7 is a schematic cross-sectional view similar to that of Fig. 6 showing still another embodiment of this invention.

Figs. 5, 6 and 7 are schematic cross-sectional views of my universal joint. In these views, I have not disclosed how the two spherical concentric members may be assembled. It is understood, however, that they may be assembled in various ways, one of which is shown in the Fetzer patent, 1,021,923, issued April 2, 1912.

In Fig. 7 are illustrated the details of another alternative embodiment similar to that illustrated in Figs. 5 and 6. Here instead of using three similar toothed rollers 16', one beveled toothed roller 16 and two beveled smooth surfaced rollers 30 are used, one toothed rack then being provided over the entire surface of one side of the slot of member 111 and a corresponding toothed rack being provided on the opposite face of the cooperating slot of inner member 113. Rollers 30 and gear 16 are then connected together in a unit in a similar fashion to that illustrated in Fig. 6 by means of transmission member 35 and pins 36. As shown, the slots provided in members 111 and 113 for rollers 30 fit snugly against the surface of these rollers in order to provide a good bearing surface as the rollers 30 rotate during the operation of the universal joint.

The terms "snug" and "snugly" as used throughout the foregoing are intended to mean that the parts are free from intended lateral play and not that they fit so tightly as to make the invention inoperative. Thus, the rollers must slide in the slots shown and described while being "snug" or free from excessive lateral motion, excepting to the extent usually encountered in the case of sliding bearing arrangements made in accordance with currently common machine designing practices. For example, some space must be provided between the sliding parts to provide room for a lubricant therebetween.

Numerous additional applications of the above-disclosed embodiments will appear to those skilled in the art and no attempt has been made to exhaust such possibilities. The scope of the invention is defined in the following claims.

What is claimed is:

1. A universal joint adapted to couple driving and driven shafts including in combination, a substantially spherical member on each adjacent end of said shafts, said spherical members being disposed one within the other, three longitudinally disposed beveled races spaced equidistant one from the other around the periphery of said spherical member of said driving shaft and each disposed in a plane including said driving shaft, three cooperating opposing longitudinally disposed beveled races spaced equidistant one from the other around the periphery of said spherical member on said driven shaft and each disposed in a plane including said driven shaft, each of the races on each of the spherical members being wholly within the spherical members and having side walls and closed ends, each of the beveled races in the inner spherical members being aligned with the beveled races in the outer spherical member, a transmission member freely mounted within the spherical member on the driven shaft having three arms extending radially outwardly from the center thereof, beveled rollers rotatably mounted on each of the arms of the transmission member, each of the rollers being disposed within a cooperating pair of the beveled races in each of the spherical members, at least one of said rollers having beveled teeth on its periphery, at least one of the beveled races in the outer spherical member having beveled teeth on one of its side walls, the cooperating beveled race in the inner spherical member having beveled teeth on its side wall opposite to the toothed side wall of the beveled race in the outer spherical member, the toothed roller being disposed within the beveled race and meshing with the teeth on the opposed walls of the beveled race, whereby said rollers roll along their respective cooperating beveled races and teeth as said joint is flexed to produce one center of deflection of said joint.

2. A universal joint as set forth in claim 1 wherein each of the rollers have a toothed portion meshing with the opposing teeth of each of the races and a smooth portion bearing against the cooperating plain surfaces of the races.

3. A universal joint as set forth in claim 1 wherein one of the rollers has teeth extending radially throughout its entire periphery, the opposing side walls of one of the races having teeth extending radially thereof throughout its entire length and the side walls of the other races and the beveled rollers having plain surfaces cooperating with each other.

JOHN T. WELSH.

REFERENCES CITED

The following references are of record in the file of this patent:

UNITED STATES PATENTS

| Number | Name | Date |
| --- | --- | --- |
| 1,440,648 | Thiemer | Jan. 2, 1923 |
| 1,625,410 | De Ram | Apr. 19, 1927 |
| 1,626,270 | Craun | Apr. 26, 1927 |
| 1,728,949 | Weiss | Sept. 24, 1929 |
| 2,236,633 | Wingquist | Apr. 1, 1941 |